United States Patent [19]
Kramer et al.

[11] Patent Number: 5,296,658
[45] Date of Patent: Mar. 22, 1994

[54] SAFETY EDGE SWITCH FOR DETECTION OF OBSTRUCTIONS ENCOUNTERED BY A MOVING OBJECT

[75] Inventors: Dennis A. Kramer, Troy; David E. Peck, Rochester Hills; Marc A. Brookman, Livonia, all of Mich.

[73] Assignee: Rockwell International Corporation, Pittsburgh, Pa.

[21] Appl. No.: 951,634

[22] Filed: Sep. 25, 1992

[51] Int. Cl.5 .............................................. H01H 3/16
[52] U.S. Cl. ..................................... 200/61.43; 49/28
[58] Field of Search ................. 200/61.43, 61.42, 511, 200/61.44, 61.41; 187/104, 105; 49/26-28, 490.1

[56] References Cited

U.S. PATENT DOCUMENTS

| | | | |
|---|---|---|---|
| 3,465,476 | 9/1969 | Rayner et al. | 49/28 |
| 3,662,491 | 5/1972 | Boyriven | 49/28 |
| 3,710,050 | 1/1973 | Richards | 200/61.43 |
| 3,727,348 | 4/1973 | Steinmann et al. | 200/61.43 X |
| 3,793,772 | 2/1974 | Kouth | 49/28 |
| 3,830,018 | 8/1974 | Arai et al. | 200/61.43 X |
| 5,023,418 | 6/1991 | Beckhausen | 200/511 |
| 5,072,080 | 10/1991 | Beckhausen | 200/61.43 |

FOREIGN PATENT DOCUMENTS

| | | | |
|---|---|---|---|
| 353332 | 2/1990 | European Pat. Off. | |
| 405351 | 1/1991 | European Pat. Off. | |
| 2544162 | 4/1977 | Fed. Rep. of Germany | 200/61.43 |
| 3424581 | 1/1986 | Fed. Rep. of Germany | |

*Primary Examiner*—J. R. Scott

[57] ABSTRACT

A safety edge switch which may be utilized to sense an obstruction present in a window opening upon closure of the respective window of an automotive vehicle. The switch may be secured to a window opening by adhesive attachment. The switch includes an outer peripheral portion preferably shaped as an oval and constructed of a resilient material which defines a central aperture. A second smaller structure constructed of conductive elastomer is located in the central aperture and secured to an internal wall thereof. A portion of the outer peripheral member opposite the second smaller oval shaped structure features a conductive elastomeric portion extending parallel thereto and maintained separate therefrom by the resilient physical properties of the outer peripheral portion. The assembly provides a switch which may be actuated upon displacement of a first dimension A which preferably interrupts application of power to the actuator causing window closure and, in addition, permits a second displacement which accommodates any overtravel such as dimension B which may occur subsequent to removal of power from the actuator closing the referenced window. The conductive elastomeric portions include copper drain wires for reliable low resistance switching along the length thereof, such that the obstruction causing displacement of the safety edge switch at any location therealong provides a change in continuity of electrical conduction therethrough. The device as indicated is sensitive to normal forces in addition to any angular force which may be applied thereto. The switch is co-extruded as one assembly.

13 Claims, 2 Drawing Sheets

SAFETY EDGE SWITCH FOR DETECTION OF OBSTRUCTIONS ENCOUNTERED BY A MOVING OBJECT

BACKGROUND OF THE INVENTION

1. Field of the Invention

This invention relates to a safety edge switch for power actuated devices such as automotive vehicle windows and, more specifically, to a safety edge switch manufactured as a single pass co-extrusion.

2. Description of the Related Art

The conventional safety edge switch typically includes a carbon-filled elastomeric material which defines the outer peripheral portion thereof as taught by Beckhausen in U.S. Pat. No. 5,023,418. It has been determined that conductive elastomeric materials which feature a carbon filler are sensitive to environmental exposure and degrade rapidly losing their resiliency and electrically conductive properties. Therefore, there is a need for a seal which can provide an outer peripheral barrier that functions to define an environmental shield about the conductive portions as well as functions as a component of the safety seal assembly, thereby minimizing parts and extending the useful life thereof.

SUMMARY OF THE PRESENT INVENTION

The present invention includes a safety edge switch which may be utilized to sense an obstruction present in a window opening upon closure of the respective window of an automotive vehicle. The switch may be secured to a window opening by adhesive attachment. The switch includes an outer peripheral portion preferably shaped as an oval and constructed of a resilient material which defines a central aperture. A second smaller structure constructed of conductive elastomer is located in the central aperture and secured to an internal wall thereof. A portion of the outer peripheral member opposite the second smaller oval shaped structure features a conductive elastomeric portion extending parallel thereto and maintained separate therefrom by the resilient physical properties of the outer peripheral portion. The assembly provides a switch which may be actuated upon displacement of a first dimension A which preferably interrupts application of power to the actuator causing window closure and, in addition, permits a second displacement which accommodates any overtravel such as dimension B which may occur subsequent to removal of power from the actuator closing the referenced window. The conductive elastomeric portions include copper drain wires for reliable low resistance switching along the length thereof, such that the obstruction causing displacement of the safety edge switch at any location therealong provides a change in continuity of electrical conduction therethrough. The device as indicated is sensitive to normal forces in addition to any angular force which may be applied thereto. The switch is co-extruded as one assembly.

These and other aspects of the present invention will become more readily apparent by reference to the following detailed description of the embodiments as shown in the drawings.

DETAILED DESCRIPTION OF THE PREFERRED EMBODIMENT

Figure 1:
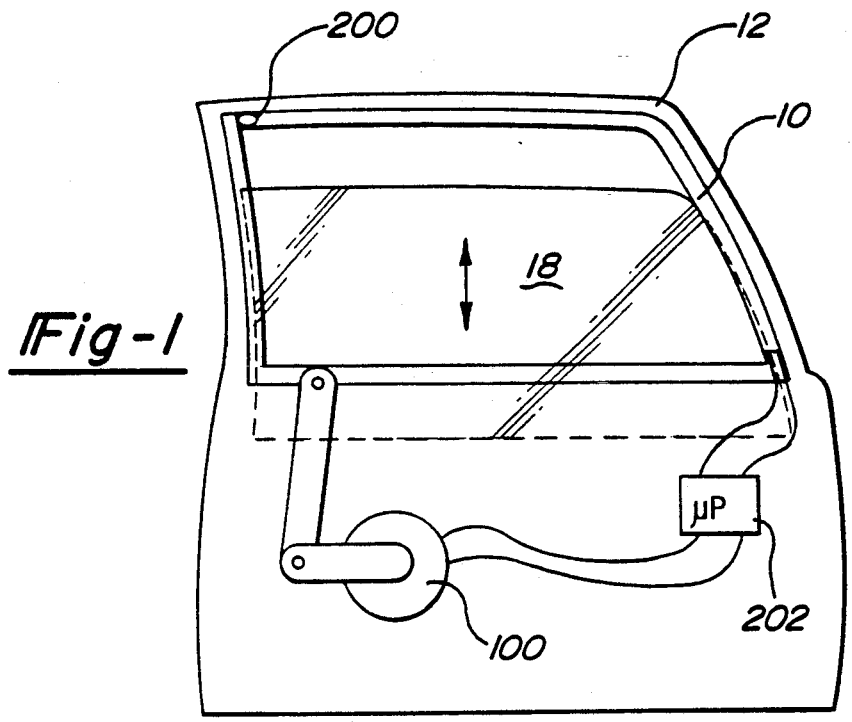
FIG. 1 is a safety edge switch system of the present invention.
Figure 2:
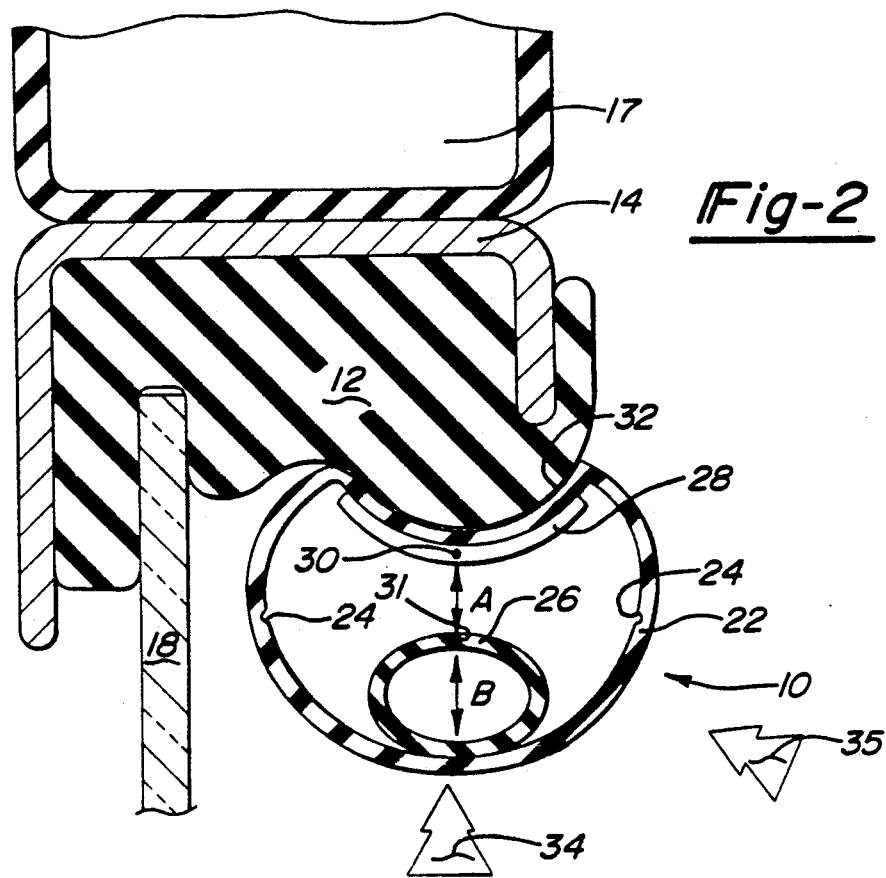
FIG. 2 is a cross section of the safety edge switch of the present invention.

The preferred embodiment of the present invention, as shown in cross section in FIG. 2 is a safety edge switch 10 installed along seal 12 of an automotive vehicle window opening. A U-shaped metal insert 14 is utilized to secure seal 12 to frame 17 of a window opening. Safety edge switch 10 comprises a continuous co-extrusion featuring an outer peripheral portion 22 shown having a generally oval section with indentations 24, 24 located on laterally opposing sides thereof. The internal aperture defined by outer peripheral portion 22 includes a second smaller oval shaped structure 26 preferably constructed of a carbon-filled elastomeric material and secured to the internal wall of outer peripheral portion 22. Strip 28 placed on the opposing internal wall of outer peripheral portion 22 is also constructed of carbon-filled elastomeric material. Structures 26, 28 include a copper drain wire 30, 31 which provide reliable low resistance switching along the length of switch 10. Safety edge switch 10 is secured to seal 12 by adhesive 32. Other techniques include mechanical attachment means or, in fact, co-extrusion of the safety edge switch 10 with seal 12. A normal force applied in the direction of arrow 34 will initially cause compression of the outer peripheral portion 22, along indentations 24. Displacement of dimension A will bring structure 26 and 28 into contact with one another providing indicia of displacement A by a change in the electrical continuity through drain wires 30, 31. In operation, such a displacement will provide indicia of the presence of an obstruction present in the widow opening during closure of window 18 against seal 10. Upon detection of the presence of such an obstruction, power to motor 100, shown in FIG. 1, causing window closure will be interrupted. Inertia associated with motor 100, and window 18 will result in a certain amount of overtravel from the point at which power is interrupted. It is anticipated that the amount of overtravel will be accommodated by displacement indicated by dimension B which is caused to occur by deflection of structure 26. As such, travel of dimension B subsequent to interruption of power to motor 100 will absorb any further motion of window 18. Those skilled in the art will note that the physical structure of the switch is such that the outer peripheral portion 22 will initially compress and second smaller oval shaped structure 26 will compress only when travel of dimension A has occurred. Those skilled in the art will recognize that continuity of the drain wire circuit may be provided by connecting drain wires 30, 31 through resistor 200 which provides a known impedance at the end of switch 10 opposite the end which is connected to motor controller 202. Alternatively, the connection of drain wires may be accomplished by use of a connector as described and claimed in my co-pending U.S. application Ser. No. 07/951,633 filed coincident with the date of this application and entitled, "Safety Edge Switch System".

The preferred embodiment of the present invention is also sensitive to forces imposed in directions other than normal such as an angular force occurring in the direction of arrow 35. The construction of the outer peripheral portion 22 provides sufficient dimensional distortion upon the incidence of angular forces to cause the structures 26 and 28 to come into contact with one another to provide indicia of the presence of an obstruction in the window opening upon closure which causes displacement of magnitude equal or proximate to dimension A. The present invention may be prepared using an extrusion die essentially featuring cross-sectional dimensions of the structure shown in FIG. 2 and utilizing a carbon-filled Santoprene for structures 26 and 28, and a non-carbon-filled Santoprene for structure 22. Santoprene is a trademark of Monsanto Corporation. The extrusion may include the copper drain wires 30, 31.

Figure 3:
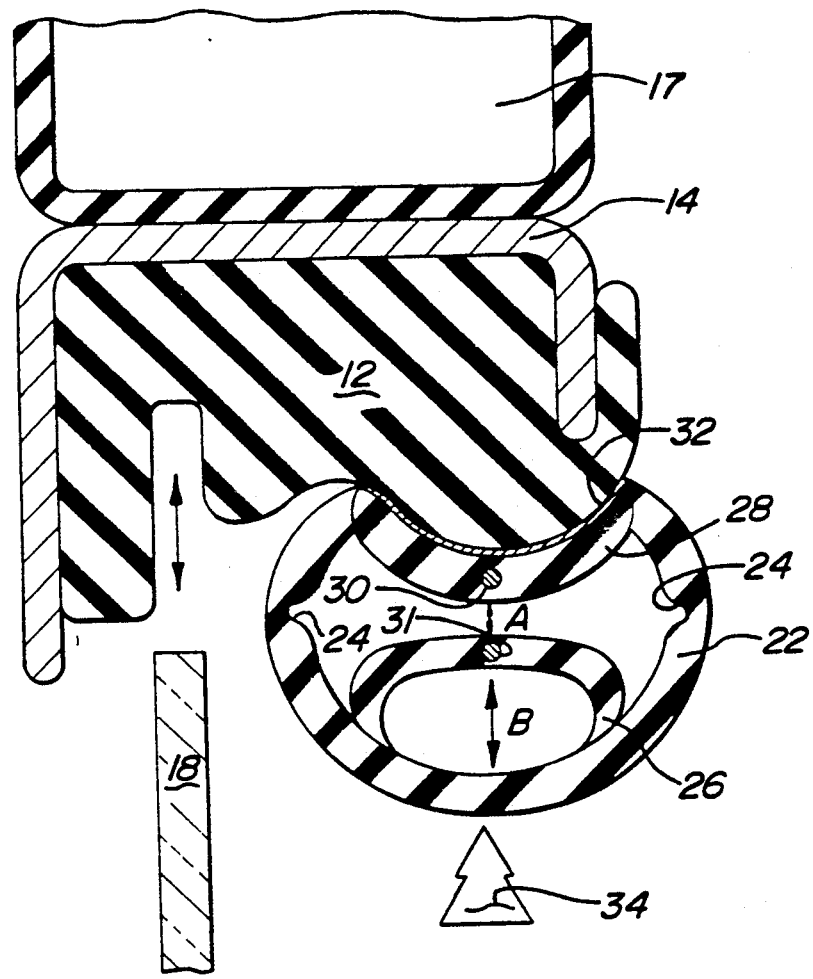
FIG. 3 is a cross section of the safety edge switch of the present invention.

FIG. 3 illustrates an alternative embodiment of the present invention in which the outer peripheral portion 22 includes a wall section 28 formed entirely of conductive elastomeric material. A second smaller oval shaped structure 26 is formed as an integral portion of outer peripheral portion 22. Drain wires 30, 31 are copper wires which provide reliable low resistance switching along the entire length of the safety edge circuit. A normal force applied in the direction of arrow 34 will deform outer peripheral portion 22 at indentations 24. Displacement of dimension A will cause contact between portions 26 and 28 providing indicia of the presence of an obstruction present in the opening sought to be monitored. Detection of such displacement will result in interruption of power to the actuator causing window closure. System inertia will result in overtravel from the point at which power was interrupted. It is anticipated that the amount of overtravel will be accommodated by further displacement indicated by dimension B.

One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the spirit and scope of the invention.

We claim:

1. A safety edge switch for detection of obstructions in a vehicle window opening comprising:
   a first member having an internal wall and defining a first central aperture;
   said first member being constructed of a resilient material;
   a second member defining a second central aperture, said second member disposed within said first member and affixed to said internal wall thereof;
   said second member constructed of a resilient conductive material;
   a continuous conductive surface disposed on said internal wall of said first member opposite said second member;
   a first and second conductive wire disposed within said continuous conductive surface and said second member;
   first and second opposed ends of said switch including means for electrical connection thereto; and
   said first aperture and said second aperture sized in relation to provide a first signal in response to a first predetermined displacement of said second member into contact with said continuous conductive surface and to permit a second predetermined displacement of said second member subsequent thereto.

2. The invention of claim 1 wherein said second end includes means for electrically connecting said first and second conductive wire to a means for determining continuity therethrough and said switch further comprises a first end including means for providing a known impedance between said first and second conductive wire.

3. The invention of claim 1 wherein said first member having an internal wall includes laterally displaced indentations formed therein.

4. The invention of claim 1 wherein said switch is disposed and affixed to a seal and said defines a closure surface for a vehicle window.

5. The invention of claim 4 wherein said seal is affixed in a U-shaped frame and secured to the top portion of a window frame.

6. A safety edge switch for detection of obstructions in a vehicle window opening, comprising:
   a first member including a continuous circuit of sides having an internal and external wall defining a first aperture;
   a portion of said first member including means to provide electrical conductivity therethrough;
   a second member including a continuous circuit of sides and defining a second aperture affixed to said internal wall of said first aperture opposite said portion of said first member including means to provide electrical conductivity therethrough;
   said second member including means to provide electrical conductivity therethrough;
   first and second opposed ends of said switch including means for conductive connection to said portion of said first member including means to provide electrical conductivity therethrough and said second member; and
   said first aperture and said second aperture sized in relation to provide a first signal in response to a first predetermined displacement of said second member into contact with said continuous conductive surface and to permit a second predetermined displacement of said second member.

7. The invention of claim 6 wherein said second end of said switch includes means for electrically connecting said means for conductive connection of said portion of said first member including means to provide electrical conductivity therethrough and said second member to a means for determining continuity therethrough and said switch further comprises a first end of said switch including means for providing a predetermined impedance value between said portion of said first member including means to provide electrical conductivity therethrough and said second member.

8. The invention of claim 6 wherein said first member having an internal wall includes laterally displaced indentations formed therein.

9. The invention of claim 6 wherein said switch is disposed and affixed to a seal and said seal defines a closure surface for a vehicle window.

10. The invention of claim 6 wherein said seal is affixed in a U-shaped frame and secured to the top portion of a window frame.

11. The invention of claim 6 wherein means to provide electrical conductivity in said portion of said first member includes a wire surrounded by carbon dispersed in an elastomeric material from which said portion of said first member is constructed.

12. The invention of claim 6 wherein said means to provide electrical conductivity in said second member includes a wire surrounded by carbon dispersed in an elastomeric material from which said second member is constructed.

13. The invention of claim 6 wherein a portion of said continuous circuit of sides of said second member comprises said first member.

* * * * *